2,537,385

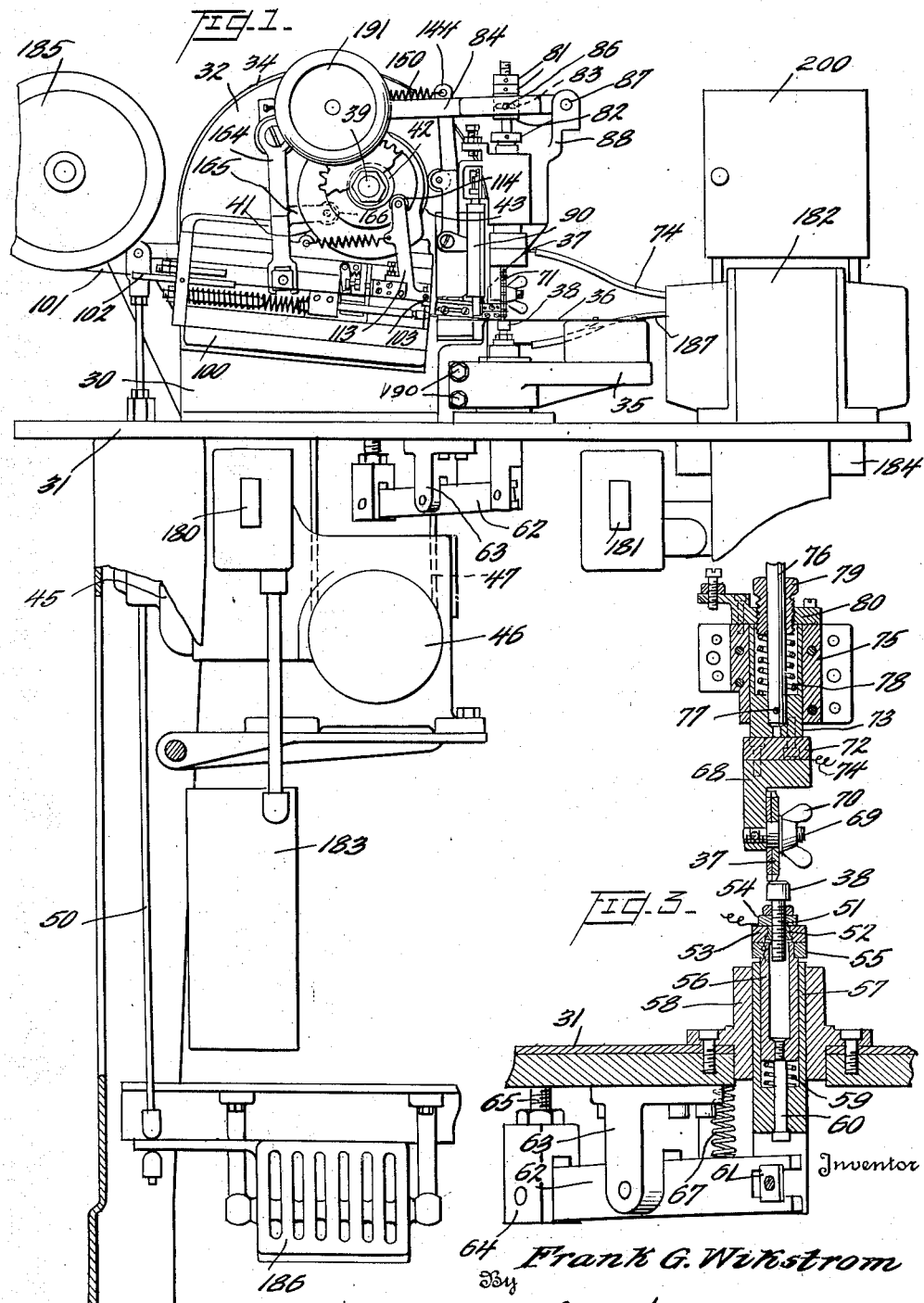

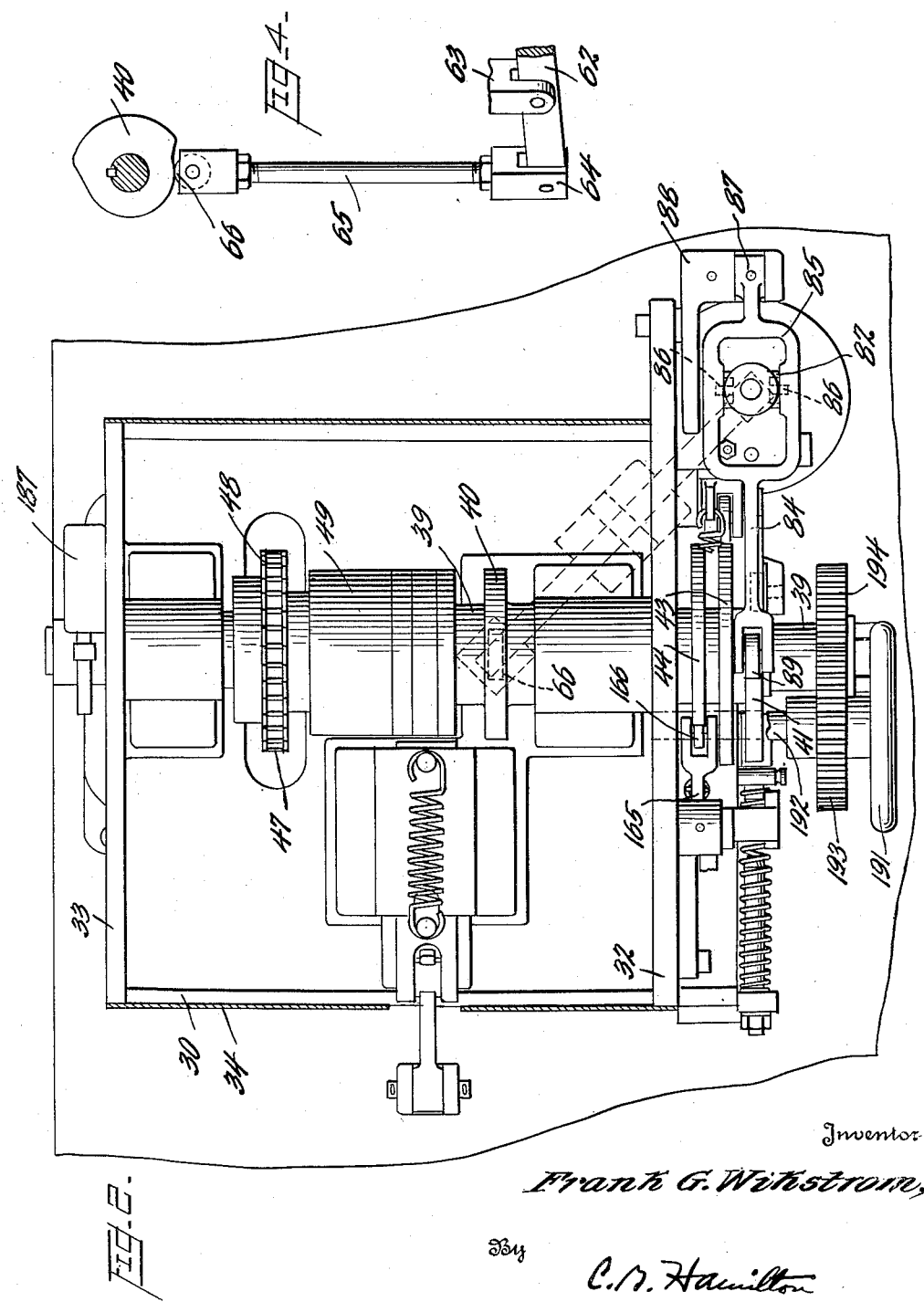

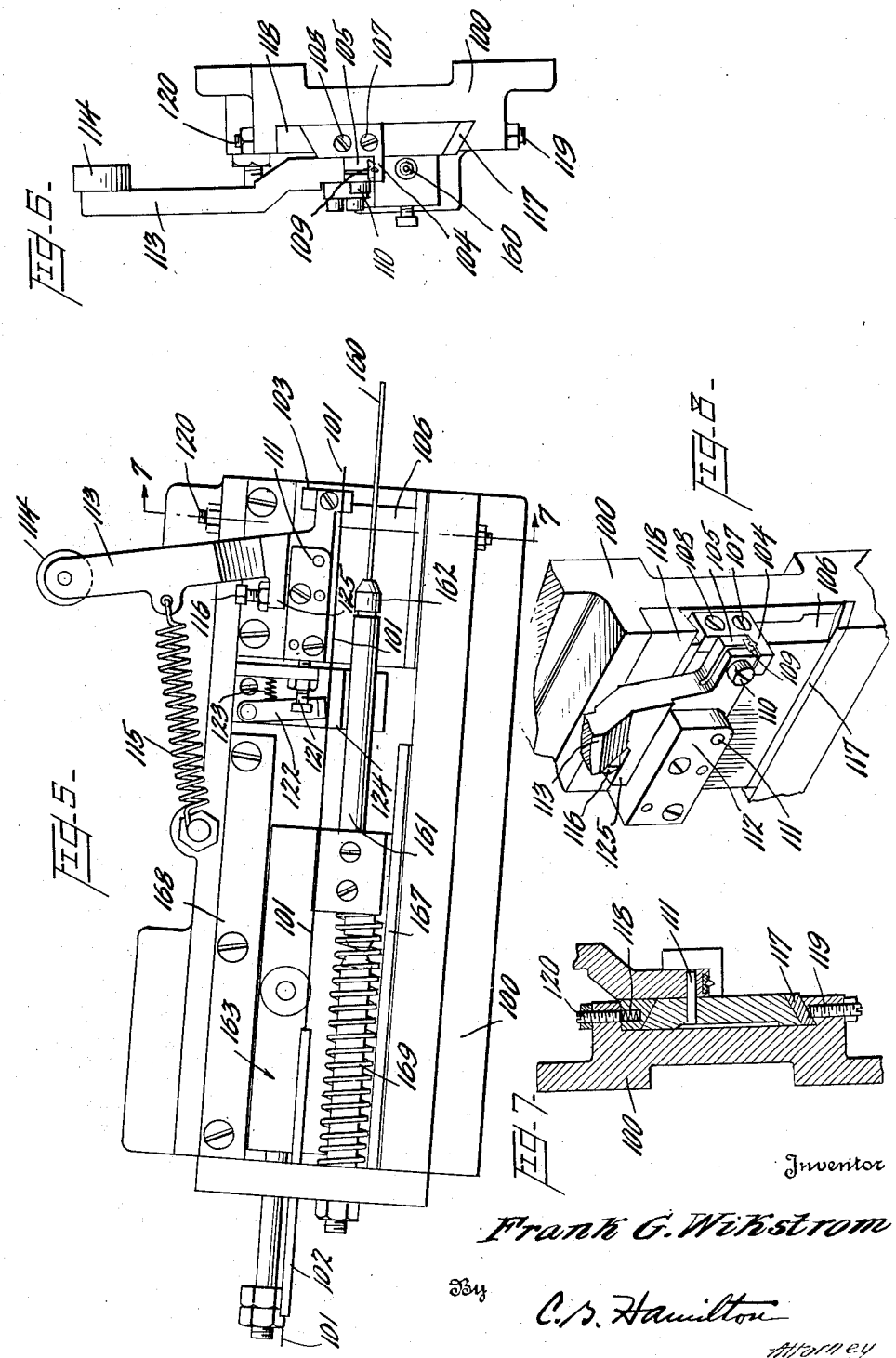

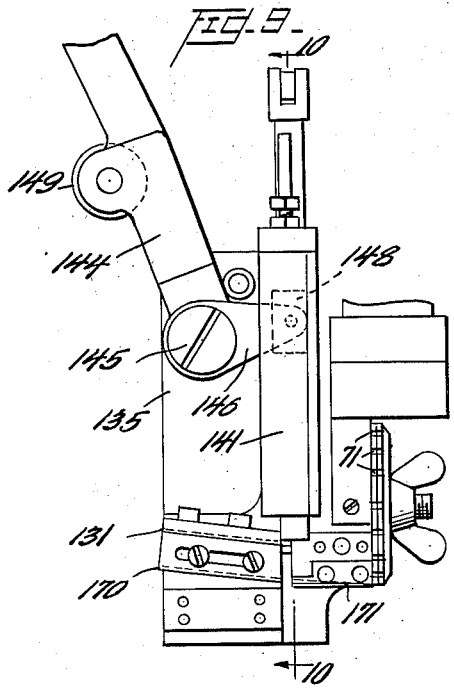
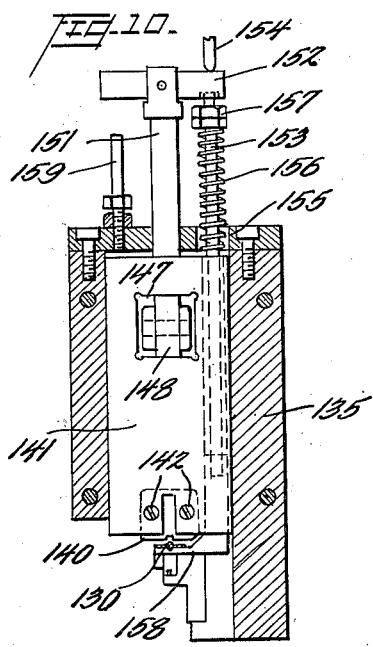
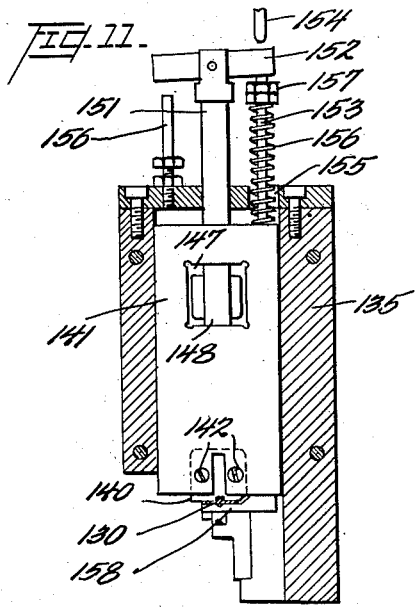
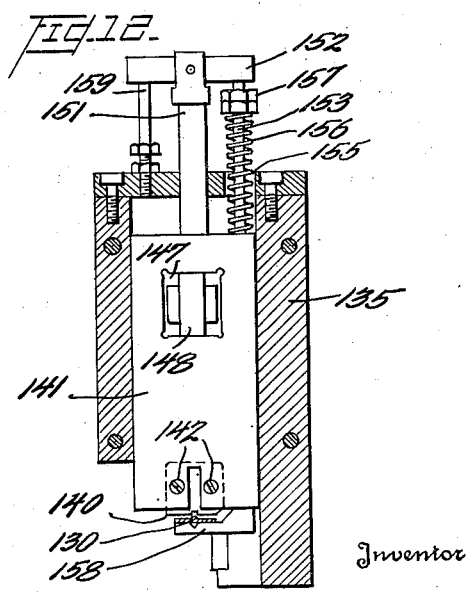
Inventor
Frank G. Wikstrom,
By C. B. Hamilton
Attorney Jan. 9, 1951 F. G. WIKSTROM 2,537,385
ELECTRIC WELDING MACHINE
Filed June 12, 1948 6 Sheets-Sheet 5
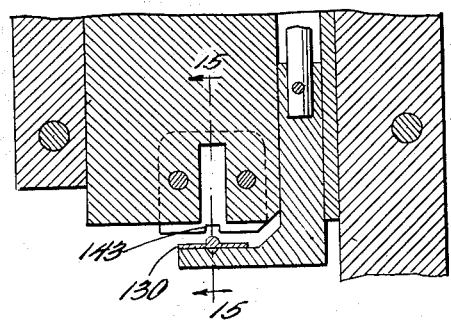
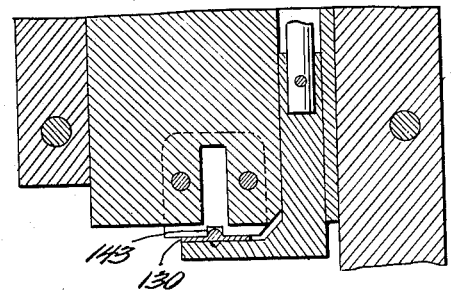
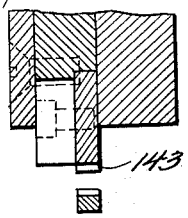
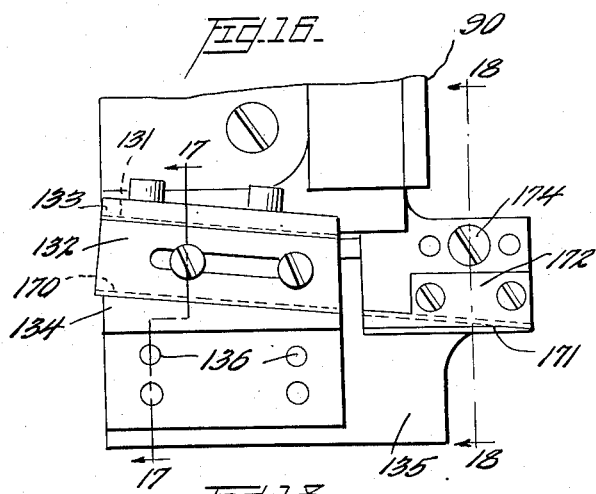
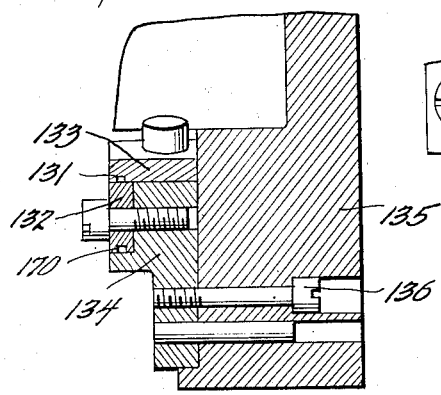
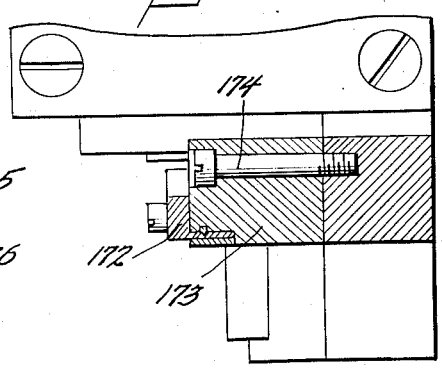
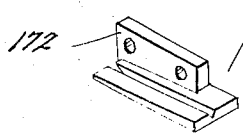
Inventor
Frank G. Wikstrom
By C. B. Hamilton.
Attorney Jan. 9, 1951    F. G. WIKSTROM    2,537,385
ELECTRIC WELDING MACHINE
Filed June 12, 1948    6 Sheets-Sheet 6
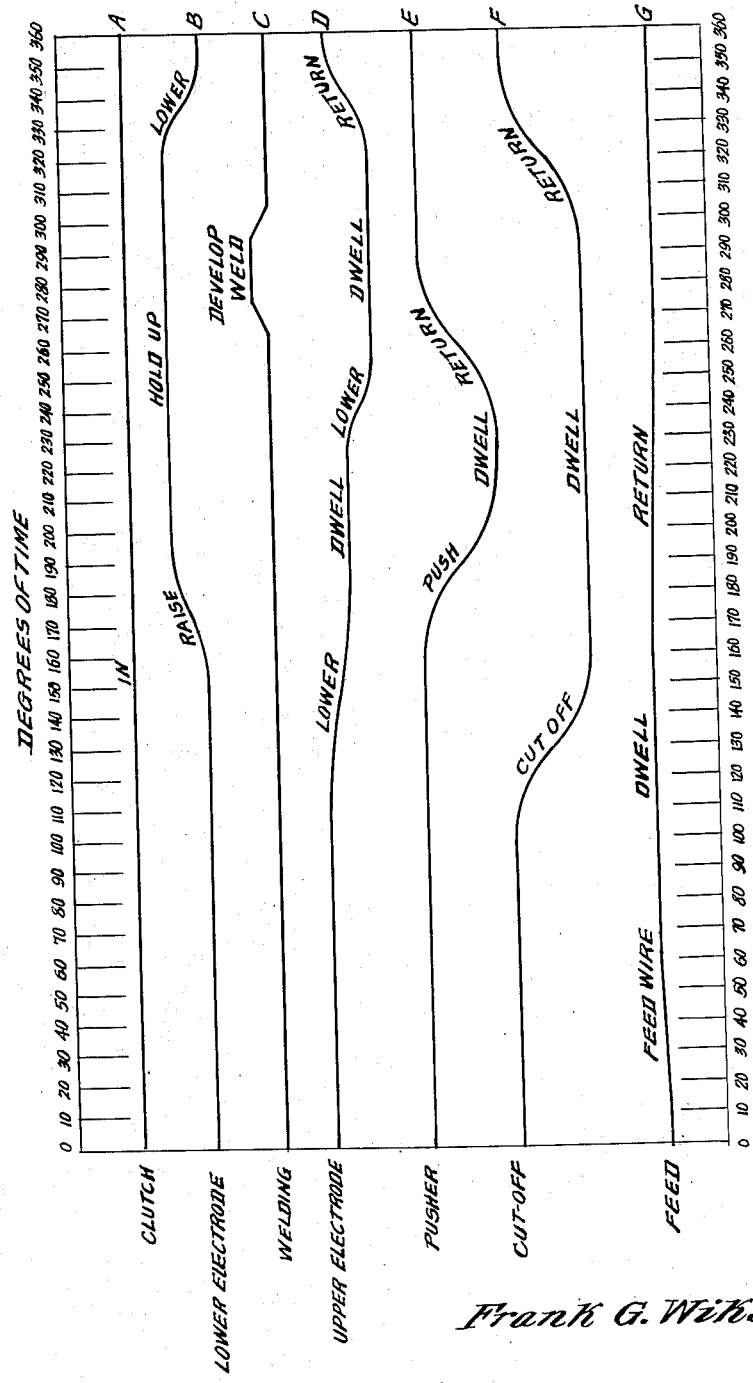
Inventor
Frank G. Wikstrom,
By C. B. Hamilton
Attorney Patented Jan. 9, 1951

UNITED STATES PATENT OFFICE 2,537,385

ELECTRIC WELDING MACHINE

Frank G. Wikstrom, Valley Stream, N. Y., assignor to Western Electric Company, Incorporated, New York, N. Y., a corporation of New York Application June 12, 1948, Serial No. 32,641

14 Claims. (Cl. 219—4)

1

This invention relates to electric welding machines and more particularly to a machine for welding bimetallic contact elements to leaf springs for use in electromagnetic relays or other electrical apparatus.

In the manufacture of contacts to be used in electrical equipment, it is sometimes necessary to use gold, silver, palladium or other noble metals. Because the use of these precious metals involves considerable expense, it is desirable that these contacts be small in size and be welded to less expensive metal in the form of leaf springs which are used to make and break electrical circuits.

An object of this invention is to provide an improved and compact welding machine for welding contact elements to leaf springs, wherein all operations and movements of the various parts of the machine are initiated and controlled by a series of cams mounted on a single cam shaft.

Another object of this invention is to provide a novel arrangement of the various operating mechanisms so that an intermittent straight line feed is imparted to a strip of contact material as it passes through the machine to a welding position.

In accordance with one embodiment of this invention, an electric welding machine for welding contacts to leaf springs is provided in which a continuous strip of contact material is advanced intermittently in a straight line through a guide channel to a pair of vertically reciprocating shearing jaws which are slidably mounted adjacent to a pair of welding electrodes. The upper jaw moves downward to grip a section of the strip between the jaws and then upon further downward movement of the jaws, a contact is severed by shearing the advanced portion of the strip material against the lower edge of the guide channel. The jaws then continue in their downward movement to carry the severed contact to a position in advance of a pusher rod. There the jaws are partially separated and the pusher rod advances to deliver the severed contact to the welding position between an upper and lower welding electrode which are compressed to weld the contact and leaf spring together.

The severing mechanism is described in greater detail and is claimed in applicant's copending application, Serial No. 32,665 filed June 12, 1948.

Other features and advantages of the invention will become apparent from the following detailed description, taken in conjunction with the accompanying drawings, in which:

Fig. 1 is a fragmentary front elevational view

2 of a welding machine embodying the features of the invention;

Fig. 2 is a top plan view of the welding machine shown in Fig. 1;

Fig. 3 is an enlarged sectional view of the operating mechanism for the welding electrodes of the apparatus shown in Fig. 1;

Fig. 4 is a detailed perspective view of the operating linkage for the lower welding electrode shown in Figs. 1 and 3;

Fig. 5 is an enlarged detailed front view of the contact feeding and delivering mechanism of the apparatus shown in Fig. 1;

Fig. 6 is an end view of the feeding and delivering mechanism shown in Fig. 5 looking from right to left;

Fig. 7 is a cross-sectional view taken on line 7—7 of Fig. 5 looking in the direction indicated by the arrows;

Fig. 8 is an enlarged fragmentary perspective view of the feeding mechanism of Fig. 5;

Fig. 9 is an enlarged front elevational view of the contact severing and transferring mechanism shown in Fig. 1;

Figs. 10, 11 and 12 are detailed vertical cross-sectional views taken on line 10—10 of Fig. 9 showing the various positions of the component members of the contact severing mechanism at the different stages of the operating cycle;

Figs. 13 and 14 are enlarged views of the gripping and severing jaws shown in Figs. 10 and 11;

Fig. 15 is a cross-sectional view taken on line 15—15 of Fig. 13 looking in the direction indicated by the arrows;

Fig. 16 is an enlarged detailed view of the lower portion of Fig. 9 showing the guide channels for the strip of contact material;

Fig. 17 is a cross-sectional view taken on line 17—17 of Fig. 16 looking in the direction indicated by the arrows;

Fig. 18 is a cross-sectional view taken on line 18—18 of Fig. 16 looking in the direction indicated by the arrows;

Fig. 19 is a perspective view of the contact guide bracket shown in Fig. 18; and Fig. 20 is a timing diagram showing the sequence of operations that occur during one complete cycle of operation of the machine with relation to the angular position of the cam shaft.

Referring now to the drawings, and particularly to Figs. 1 and 2, the numeral 30 designates a housing or base for supporting the various parts and assemblies in their operative positions. The base 30 is securely mounted upon a table 31 and consists of an integral casting having two upright members 32 and 33 which are semi-circular in shape as shown in Fig. 1. Secured to the base 30 and to the side members 32 and 33 is a shield 34 made of "Lucite" or other transparent material for the purpose of preventing dust and dirt from getting into and interfering with the operation of the enclosed mechanisms while permitting visual observation of the operations.

An adjustable fixture 35 of suitable contour is mounted on top of the table 31 for supporting a switch or leaf spring 36 or other electrical part on which a contact of precious metal is to be welded. As shown in Fig. 1, the left end of the switch spring 36 projects beyond the fixture 35 into a gap between an upper welding electrode 37 and a lower welding electrode 38; these electrodes at the time of positioning of the switch leaf spring upon the fixture being appreciably spaced apart for the purpose of facilitating the positioning of the spring. Although in the illustrated embodiment of the invention the leaf springs 36 are manually positioned on the fixture 35, suitable automatic means may be associated with the machine for automatically and intermittently feeding a train of springs forward to the welding position in timed relation to the operation of the welding machine.

Journaled in the side members 32 and 33 of base 30 is a rotatable cam shaft 39 upon which are fixed cams 40, 41, 42, 43 and 44 which control the operation of the welding electrodes 37, 38 and other various mechanisms in a predetermined sequence. The cam 42 is nested within a recess in the front face of the cam 41. A pivotally mounted electric motor 45 has a driving pulley 46 for a belt 47 which drives a pulley 48 rotatably mounted on the rear end of the cam shaft 39. Interposed between the driven pulley 48 and the cam shaft 39 is a conventional one revolution clutch designated generally in Fig. 2 by the reference numeral 49 which is operated by momentarily depressing a foot pedal controlled rod 50 whereby the cam shaft and the cams thereon traverse through a single revolution. Upon completion of one cycle of rotation of the cam shaft, the single revolution clutch 49 is automatically disengaged to interrupt the drive to the cam shaft 39 to stop the rotation of the cams and the sequence of operations until the rod 50 is depressed again to repeat the cycle of operation.

The lower welding electrode 38 which is made of copper has formed integral therewith a threaded shank 51. This threaded shank is adjustably mounted in a bushing 52 positioned within a recess in an insulator block 53. The insulator block 53 is positioned between a conductor bar 54 and a collar 55, the latter being pinned to a hollow cylindrical slide 56. It is through this conductor bar 54 that electrical energy is supplied to the lower electrode during the welding operation. The cylindrical slide 56 is located in reciprocating relation within a recess of a sliding member 57. The sliding member 57 is mounted to reciprocate within a bearing member 58 which is rigidly secured to the table 31. A compressible spring 59 placed within the recess of sliding member 57 resiliently supports the slide 56.

The relative movement between slide 56 and slide member 57 is limited by an adjustable shoulder screw 60 which passes through a longitudinal central aperture in slide member 57 and is threaded into positive engagement with the slide 56. The lower portion of sliding member 57 is bifurcated and a slidable block 61 is pivotally mounted therein. An operating arm 62, pivotally supported at its middle portion by a yoke 63, is bifurcated at both ends and one end is in operative engagement with the slidable block 61. The opposite end of this operating arm 62 is similarly mounted within a bifurcated block 64. A push rod 65 is secured to the block 64 and has rotatably mounted at the opposite end thereof a roller 66 (Figs. 2 and 4) so as to be in operative engagement with the cam 40. A compression spring 67 positioned between the operating arm 62 and the table 31 forces the right end of the operating arm down and thus the left end up to maintain the roller 66 in operative engagement with the peripheral surface of the cam 40.

The upper welding electrode 37 is secured to an offset member 68 by means of a stud 69 and a wing nut 70. The upper electrode also has a series of peripheral notches 71 for receiving the contact to be welded and is rotatably adjustable on its support to permit proper alignment. The offset member 68 is secured to an insulator block 72 which in turn is secured to a recessed slide 73. A power lead 74 attached to the offset member 68 conducts current to the upper welding electrode. The recessed slide 73 extends through a bearing housing 75 and is longitudinally slidable therein. The bearing housing 75 is fastened to the base 30. A push rod 76 extends through the recessed portion of the slide 73 and is secured thereto by means of a pin 77.

Also positioned within the recessed portion of the slide 73 and surrounding the push rod 76 is a compression spring 78, the upper portion of which presses against a hollow plug 79. This hollow plug 79 is threaded into a stop support member 80 which is secured to the bearing housing 75. Thus while the upper electrode 38 is in its inoperative or raised position, the compression spring 78 will continually exert a force tending to move the recessed slide 73 and push rod 76 down. The upper end of the push rod 76 is threaded to receive adjusting nuts 81 (Fig. 1). Slidably mounted on the push rod 76 is a collar 82 having a circumferential slot 83. A pivotally mounted lever arm 84 has a split section 85 that surrounds the collar 82. Fixed to each side of the inner surface of this split section 85 is a pivot pin 86 which slides in the slot 83. Thus, oscillatory motion of lever arm 84 is imparted to the push rod 76 as reciprocatory motion. One end of the lever arm 84 is pivotally mounted at 87 to a bracket 88 which is attached to side member 32 of base 30. The opposite end of the lever arm 84 has mounted thereon a follower roller 89 (Fig. 2) which engages the cam 41 due to action of the compression spring 78 on the push rod 76.

The mechanism for feeding and delivering a contact strip to a severing mechanism 90 is supported on an elongated feeding mechanism frame 100 on the base 30. The contact metal is introduced into the machine in the form of a continuous strip or tape 101 of suitable cross section for satisfactory welding and electrical service. The strip may be bimetallic and may be rolled or otherwise formed into the required cross section. As shown in Fig. 5, the contact strip 101 is drawn through a fixed straight guide 102 by means of a feeding mechanism 103. Referring now to Figs. 5, 6 and 8, cooperating jaws 104 and 105 comprise a chuck for engaging and advancing the contact metal strip. The lower chuck jaw 104 is notched to correspond to the contour of the lower portion of the strip and is secured to a slide 106 by means of screws 107 and 108. The upper jaw 105 is bifurcated for the reception of a removable insert 109 which is notched to correspond to the contour of the upper portion of the contact metal strip 101. The insert 109 may be removed by merely loosening a holding screw 110 and another insert of different contour inserted when a contact metal strip of different shape is used. The upper jaw 105 is pivotally mounted on the slide 106 by means of a pivot pin 111 which passes through a bifurcated portion 112 of the slide 106 and the rear portion of the upper jaw 105. The upper jaw 105 comprises one end of a feed lever 113, the opposite end of which has mounted thereon a cam follower roller 114 which due to the action of a tension spring 115 attached thereto forces the roller to follow the peripheral contour of the cam 42 (Fig. 1). The feed lever 113 has formed integral therewith a heel portion 125. An adjustable screw 116 passes through this heel portion and bears against the upper projecting part 112 of the slide 106 (Fig. 8). Thus by varying the position of the screw 116, the effective distance that the upper jaw 105 will pivot from the lower jaw can be varied. The slide 106 is supported and positioned for sliding movement by gibs 117 and 118 secured to the frame 100 by means of screws 119 and 120 (Fig. 7). Adjustably mounted in a threaded section of the frame 100 is a slide limit screw 121 which abuts against the rear face of the slide 106 to limit the rearward movement thereof. By varying the position of either or both of the adjustable screws screws 116 or 121, the effective motion imparted to feed a desired length of the wire or strip 101 through the machine may be controlled.

Depending from the frame 100 and pivotally supported thereon is a check arm 122 for holding the contact strip material 101 stationary during the return stroke of the feeding jaws 104 and 105. The strip material is in frictional engagement with the check arm 122 during the feeding operation, thus this check arm will pivot in a counterclockwise direction against the force of a spring 123 allowing the strip material to be draw forward during feeding. Upon completion of the forward feed of the strip material, the spring 123 returns the check arm 122 to its initial position where the check arm wedges the contact strip material against a projecting section 124 of the frame 100 to prevent retrograde movement of the strip.

In feeding the contact material, an advanced portion 130 of the strip 101 is feed into a guide channel 131 (Figs. 16 and 17) formed by a pair of plates 132 and 133 mounted on a bracket 134, which is secured to a frame 135 by bolts 136. This frame 135 also supports the severing mechanism 90 and is secured to the base 30. The guide channel 131 has the same cross section as the strip and guides the strip to the severing mechanism 90 as it is fed forward by the jaws 104 and 105.

The construction of the severing mechanism 90 is shown in Figs. 9 and 15 and the various operative positions of the parts thereof are illustrated in Figs. 10, 11, 12, 13 and 14.

An upper shear jaw 140 is removably secured to a vertically reciprocating slide 141 by means of machine screws 142. The upper shear jaw has a notch 143 (Figs. 13 and 14) therein to correspond with the upper cross-sectional contour of the contact strip. This jaw may be removed and replaced when worn or when the cross-sectional contour of the contact strip is changed. The reciprocating slide 141 is positioned for vertical sliding movement within the fixed frame 135 which is secured to the base 30.

An L-shaped rocker 144 pivotally mounted by a screw 145 to the frame 135 has one arm 146 extending into a slot 147 in the vertically reciprocating slide 141. At the end of this arm there is pivotally mounted a block 148 longitudinally slidable within the slot 147 so that when the rocker 144 is oscillated, the motion imparted to the slide 141 will be a reciprocatory movement in a vertical plane. Mounted on the middle portion of the other arm of the rocker 144 is a cam follower roller 149. A tension spring 150 (Fig. 1) secured at one end to the base 30 and at the other end to the rocker arm 144 insures the engagement of the roller 19 with the peripheral face of the cam 43. Thus displacement of the roller 149 by the rotating cam 43 will oscillate the L-shaped rocker 144 about its pivot 145, simultaneously causing the block 148 to slide in the slot 147 and to reciprocate the slide 141 in the stationary frame 135 in accordance with the peripheral contour of the rotating cam 43.

Secured in the upper part of the slide 141 is an upright stud or bracket 151 upon which is pivotally mounted a rocker arm 152. In the inoperative or normal position as shown in Fig. 10, the rocker arm 152 is held in a horizontal position by a spring biased rod 153 pressing against the rocker arm. Counterclockwise rotation of the rocker arm 152 is prevented by means of a stop 154 secured to the stop support member 80 (Fig. 2). The rod 153 passes through an aperture 155 in the upper surface of the frame 135 and is maintained in its uppermost position by means of a compression spring 156 acting between an adjustable collar 157 and the upper surface of slide 141. Secured to the lower end of the rod 153 is a lower cutter jaw 158. A fixed stop 159 is secured to the upper face of the frame 135 for the purpose of engaging and causing the rocker arm 152 to pivot upon downward movement of the slide 141.

After the contact section 130 to be welded has been severed from the contact strip 101, the severing jaws 140 and 158 transfer this contact to a position in advance of a delivery rod 160. As shown in Fig. 5 this delivery rod is secured to a reciprocating plunger 161 by means of a collet 162. The plunger 161 is secured to a sliding block 163 which is slidably positioned within the frame 100. The block 163 is reciprocated by means of an oscillating arm 164 (Fig. 1) pivotally secured to the side member 32 of the base 30. Intermediate the ends of the arm 164 and rigidly secured thereto is an arm 165 having rotatably mounted thereon a cam follower roller 166 which rides against the peripheral surface of the cam 44 (Fig. 2). Tending to force the block forward along the longitudinal guide members 167 and 168 is a compression spring 169. The forward section of the thin flexible delivery rod 160 acts through a lower guide channel 170 (Figs. 16 and 17) formed between the plates 132 and 134 and is accurately aligned with the gap between the severing jaws 140 and 158 when they are in their lowermost position (Fig. 12).

Positioned to the right of the reciprocating severing jaws and intermediate the welding position, as shown in Figs. 9 and 16, is a delivery channel 171 formed between a bracket 172 (Figs. 18 and 19) and a guide block 173. The guide block 173 is secured to a continuation of the slide frame 135 by means of a screw 174.

In order to condition the welding machine for automatic operation a pair of starting switches 180 and 181 are provided which, when closed, energize the following circuit from a suitable source of power through the switch 180, the motor 45, through the switch 181 and a transformer 182 back to the source of power. Suitable fuses contained in fuse boxes 183 and 184 are provided to protect the respective electrical circuits to the motor 45 and the transformer 182 from excessive power loads.

In operating the welding machine, a switch leaf spring 36 or other electrical part on which a contact is to be welded is placed upon the fixture 35 with its left end extending between the upper and lower welding electrodes 37 and 38. The strip of contact material 101 is introduced into the machine from a supply reel 185 and moved in a straight line through the fixed cylindrical guide 102 and the feed jaws 104 and 105 to a position adjacent the severing jaws.

The adjustable fixture 35 may be set at various preselected positions by loosening a pair of holding bolts 190, moving the fixture about the bearing member 58 (Fig. 3) to the desired position and then retightening the bolts. Thus a means is provided whereby a contact element 130 may be welded to a contact leaf spring 36 at various preselected angles.

The operating cycle is then initiated by depressing a foot pedal 186 attached to the push rod 59 which causes the single revolution clutch 49 to engage the cam shaft with the driving means thus causing the cams 41—44 to rotate and actuate the various mechanisms in timed sequence.

The timed sequence of operation is indicated in Fig. 20 wherein an upper line A (clutch) shows that the clutch is in engagement during the entire cycle of revolution of the cam shaft. Rotation of the cam shaft 39 first moves the feed lever 113 (Figs. 1 and 5) about its pivot 111 to grip the contact material 101 between the insert 109 and the lower feed jaw 104 (Figs. 6 and 8). Continued movement of the feed lever by the cam 42 causes the feed lever 113 to move the slide 106 forward to feed the contact strip material 101 to the severing mechanism 99. The movement of the feed mechanism relative to the position of the cam shaft 39 during a cycle of operation is indicated by a lower line G (feed) in Fig. 20.

After the feed mechanism 103 has completed its forward motion and a slight dwell has taken place, the feed jaws 104 and 105 are returned to their initial position. During this return, retrograde movement of the contact strip material 101 is prevented by the check arm 122 being forced against the contact strip by the combined action of the spring 123 and the wedging effect caused by the contact strip material tending to rotate the check arm against the stop 124.

The advanced portion 130 of the contact strip material 101 is fed into the gap between the spaced upper and lower severing jaws 140 and 158 as shown in Fig. 10. The jaws 140 and 158 are held apart because counterclockwise rotation of the rocker arm 152 is prevented by stop 154 whereby the spring biased rod 153, bearing against the rocker arm 152, is prevented from rising and carrying the lower jaw 158 into engagement with the upper jaw 140.

Initial downward motion of the reciprocating slide 141 causes the rocker arm 152 to slightly pivot in a counterclockwise direction and simultaneously the upper jaw 140 slides into engagement with the strip of contact material 101 and grips it against the lower jaw 158. The material now securely grasped by the jaws 140 and 158 is severed from the strip 101 by the shearing action of the jaws 140 and 158 in moving past and engaging the forward edge of the guide channel 131. The sliding movement of the upper jaw 140 is shown relative to the position of the cam shaft and the other parts during an operating cycle in Fig. 20 by the line F (cut-off).

The downward movement of the severing jaws 140 and 158 continues, transferring the severed contact to a position in alignment with the delivery rod 160 (Fig. 12). While the downward movement of the severing jaws is continuing the rocker arm 152 follows along with the slide 141 as shown in Fig. 11 until the rocker arm strikes stop member 159 to cause the jaws 140 and 158 to separate upon reaching the lower delivery position as shown in Fig. 12. The position of the delivery rod 160 in its operative cycle relative to the operating cycles of the other mechanisms in the machine is represented in Fig. 20 by the line E (pusher). The separation of the severing jaws 140 and 158 in the lower position is not as great as that in the initial position; thus the severed contact is prevented from getting out of alignment during its transfer from the jaws 140 and 158 to the guide channel 171 and onto the leaf spring 36 in welding position.

As the delivery rod 160 is withdrawn, the upper and lower welding electrodes 37 and 38 are moved into engagement with the severed contact and the leaf spring 36, respectively. The contact is tightly pressed against the upper surface of the leaf spring 36 due to the action of the resiliently mounted electrodes 37—38. The relative positions of the upper or lower welding electrodes with regard to the other mechanisms in the machine during a cycle of operation is shown by lines B and D in Fig. 20. The diagram shows that the upper welding electrode is lowered into welding position in two steps. This allows for a wider separation of the electrodes in their non-welding position thus providing a larger gap between the electrodes to facilitate the positioning of the leaf spring and the contact between the electrodes.

Welding current is then introduced to the electrodes from the transformer 182 through the flexible leads 74 and 187 and is controlled by a switch 188 operated by a cam 189 mounted on the cam shaft 39. The portion of the cycle of operation in which the welding current is applied is indicated in Fig. 20 by a line C (welding). In order to simplify the drawings, the details of the welding circuit contained in a housing 200 are not shown but any well known suitable circuit can be used for supplying and controlling the welding current.

When it becomes necessary to operate the welding machine at a very slow rate or through a portion of a cycle, as would be the situation when initially feeding the contact strip material into the machine or in setting up the machine, a manual control means is provided in the form of a hand wheel 191. The hand wheel 191 is secured to a shaft 192 journaled in the side member 32 of the base 30. Operatively connecting the cam shaft 39 with the shaft 192 is a pair of meshing gears 193 and 194; thus the hand wheel is maintained in continuous driving relation with the cam shaft 39.

It is to be understood that the above described embodiment of the invention is simply illustrative of the application of the principles of the invention. Manifestly, numerous other arrangements and modifications may be readily devised

What is claimed is:

1. In an electric welding machine, a welding electrode, means for feeding strip material to be welded, said means comprising a pair of jaws for advancing the strip material in a straight line to the welding face of said electrode, a cutter positioned adjacent the welding electrode, means for moving the cutter in a straight line to cut a section from the strip material and simultaneously carry it transversely of the direction of material feed so as to bring the severed section into a position which is in alignment and parallel to the face of said electrode, and means for advancing said severed section to the welding position.

2. In an electric welding machine, a welding electrode, a slide, a first jaw fixed to the slide, a second jaw pivoted on the slide, means to pivot the second jaw toward the first jaw to grip a strip of material and move the slide to advance the strip of material in a straight line to the welding face of said electrode, means for simultaneously shearing a section from the strip material and carrying it in a single unidirectional movement transversely of the direction of material feed so as to bring the sheared section into a position which is in alignment with and parallel to the face of said electrode, and means for advancing the sheared section to a position beneath the welding electrode.

3. In a welding machine, a pair of resiliently mounted welding electrodes movable toward each other, a plurality of cams mounted upon a single cam shaft, a severing means, means for intermittently feeding strand material in a straight line to the severing means, means to move the severing means in a straight line to shear a section of the strand material and deliver it to a position in alignment with the space between the welding electrodes, means for advancing the severed material between the welding electrodes in a straight line parallel to the direction of material feed, means for moving said electrodes toward each other and into operative engagement with the material, means for energizing said electrodes, and a motor for rotating the cam shaft so that all of said means are controlled for timed operation by the cams on said cam shaft.

4. In an electric welding machine, a pair of relatively movable opposed electrodes, means for supporting an electrical contact leaf spring in welding position between said electrodes, an adjustable feeder for intermittently advancing a continuous length of contact material along a straight line to a cutting device, means for moving the cutting device in a unidirection to engage and shear a section of material and deliver it to a second position in advance of said welding electrodes, means to release the cutting device from engagement with the severed material in the second position, and a reciprocating member for transferring the severed material to the welding position on the leaf spring.

5. In a welding machine, a pair of relatively movable opposed welding electrodes, means for intermittently advancing material between the welding electrodes, means for operating both the material advancing means and the electrodes in a predetermined sequence to move the material between the said electrodes and then to move the electrodes into engagement with the material, said advancing means comprising a sliding block having a jaw member fixed thereto, a second jaw pivotally mounted on said sliding block, and means for pivoting the second jaw toward the first jaw to grip the material and move the sliding block forward to advance the material.

6. In an electric welding machine, a pair of relatively movable opposed electrodes, means for feeding material between the electrodes, means for actuating the material feeding means to move the material between the electrodes and then actuating the electrodes into contact with the positioned material, said feeding means comprising a slide having a jaw member fixed thereto, a second jaw pivotally mounted on said slide, means for pivoting the second jaw towards the first jaw to grip a section of the material and to move the slide forward to advance the material, and means to adjustably vary the pivoted movement of the second jaw.

7. In an electric welding machine, a pair of opposed electrodes movable towards each other, means for feeding material to be welded between said electrodes, means for operating the feeding means and said electrodes in timed relation to feed a section of material between said electrodes and then to move the electrodes into contact with the section of material, said feeding means comprising a slide having a jaw member secured thereto, a second jaw pivotally mounted on said sliding block, means for pivoting the second jaw toward the first jaw to grip a section of material and to move the sliding block forward to advance the material, and means to adjustably vary the effective movement of the sliding block, said feeding means being mounted in a straight line opposite the electrodes to feed the material in a straight line thereto.

8. In a welding machine, a straight tubular guide, strand feeding means positioned in alignment with said guide, a reciprocating cutter, a pair of resiliently mounted welding electrodes, means for operating said feeding means to move a strand material through said straight guide and to feed a section of the material to the reciprocating cutter, means for actuating said cutter to cut the section of material fed and deliver it to a position in advance of said welding electrodes in a single unidirectional movement, and spring pressed means for advancing said material to a position between said electrodes.

9. In an electric welding machine, a pair of resiliently mounted opposed electrodes at a welding position, a supply reel for strand material, means for feeding the strand material from said supply reel to a position between the said electrodes, said feeding means comprising a slide with gripping jaws, means for moving the gripping jaws to intermittently grip the material and feed it forward, means to adjust the movement of one of the gripping jaws to vary the length of material fed, a severing and transferring mechanism consisting of a pair of vertical reciprocating jaws for grabbing the material, severing it and delivering it to a position adjacent to the welding electrodes in a single straight line movement, and means for transferring said severed material to the welding position.

10. In an electric welding machine, a housing, a cam shaft rotatably mounted in the housing, a bench for supporting the said housing, a reciprocable upper electrode supported by the housing, a lower reciprocable electrode supported by the bench, cams on the cam shaft for actuating the electrodes, means mounted under and extending through the bench and controlled by a cam on the cam shaft for moving the lower electrode toward the upper electrode, means supported by the housing and controlled by a cam on the cam shaft for moving the upper electrode toward the lower electrode, a strand feeding and cutting mechanism carried by the housing and mounted in a straight line opposite the space between the two electrodes, means for operating the cam shaft to move the electrodes toward each other, and means for actuating the strand feeding and cutting mechanism to feed a portion of a strand in a straight line to a position between the electrodes.

11. In an electric welding machine, a housing, a cam shaft rotatably mounted in the housing, a bench for supporting the said housing, a reciprocable upper electrode supported by the housing, a lower reciprocable electrode supported by the bench, a motor pivotally mounted to and under the bench, means extending from the pivoted motor and through the bench to drive the cam shaft, cams on the cam shaft for actuating the electrodes, means mounted under and extending through the bench and controlled by a cam on the cam shaft for moving the lower electrode toward the upper electrode, means supported by the housing and controlled by a cam on the cam shaft for moving the upper electrode toward the lower electrode, a strand feeding and cutting mechanism carried by the housing and mounted in a straight line opposite the space between the two electrodes, and means for actuating the strand feeding and cutting mechanism to feed a portion of a strand in a straight line to a position between the electrodes.

12. In an electric welding machine, a pair of relatively movable opposed electrodes, a work holder for holding an article between the electrodes, said work holder being mounted for rotation about one of the electrodes, means to secure the work holder in a variety of positions whereby an article is held at various preselected angles about the center line of the said electrode, and means for moving both of the electrodes into engagement with the article to be welded.

13. In an electric welding machine, a pair of relatively movable opposed electrodes, one of said electrodes being cylindrical in shape, a bearing surrounding the cylindrical electrode, a work holder for holding an article between the electrodes, said work holder being rotatably mounted on the bearing around the cylindrical electrode, means for securing the work holder at various preselected positions about the longitudinal axis of the cylindrical electrode, means for moving the cylindrical electrode through the bearing into engagement with one side of the article held by the work holder, and means for moving the other electrode into engagement with the other side of the article held by the work holder.

14. In an electric welding machine, a pair of movable electrodes, means to intermittently feed strip material in a straight line toward the electrodes, means to move said electrodes and said material feeding means in timed relation to feed the material between the electrodes and then to move the electrodes into contact with the material, said feeding means including a reciprocating slide, an adjustable means for limiting the movement of the slide, a jaw member secured to the slide, a second jaw pivotally mounted on said slide, means for pivoting the second jaw toward the first jaw to grip a section of the material and to move the slide forward to advance the material, and means to vary the pivotal movement of the second jaw.

FRANK G. WIKSTROM.

REFERENCES CITED

The following references are of record in the file of this patent:

UNITED STATES PATENTS

| Number | Name | Date |
|---|---|---|
| 2,024,597 | Pfeiffer | Dec. 17, 1935 |
| 2,101,156 | Payne | Dec. 7, 1937 |
| 2,129,845 | King et al. | Sept. 13, 1938 |
| 2,408,847 | Gross et al. | Oct. 8, 1946 |
| 2,458,928 | Brooks | Jan. 11, 1949 |